United States Patent
Valentine

(10) Patent No.: US 6,355,180 B1
(45) Date of Patent: Mar. 12, 2002

(54) SWIMMING POOL COVERING, HEATING, AND CLEANING SYSTEM

(76) Inventor: Joseph Valentine, 145 Lee High Ave., Blackwood, NJ (US) 08012

( * ) Notice: Subject to any disclaimer, the term of this patent is extended or adjusted under 35 U.S.C. 154(b) by 0 days.

(21) Appl. No.: 09/707,466

(22) Filed: Nov. 7, 2000

Related U.S. Application Data

(60) Provisional application No. 60/165,022, filed on Nov. 12, 1999.

(51) Int. Cl.$^7$ .............................. E04H 4/10; E04H 4/16
(52) U.S. Cl. ....................... 210/776; 210/169; 210/238; 4/490; 4/502
(58) Field of Search ................................ 210/776, 169, 210/236, 238, 242.1; 4/496, 498, 502, 503, 490

(56) References Cited

U.S. PATENT DOCUMENTS

| | | | |
|---|---|---|---|
| 3,152,076 A | * 10/1964 | Kreutzer | 210/169 |
| 3,840,118 A | * 10/1974 | Whitmore | 210/169 |
| 4,369,109 A | * 1/1983 | Edye | 210/238 |
| 4,459,711 A | * 7/1984 | Sartain et al. | 4/502 |
| 4,836,920 A | * 6/1989 | Miller, Jr. | 210/169 |
| 5,038,419 A | * 8/1991 | MacDonald et al. | 4/502 |
| 5,277,801 A | * 1/1994 | Lundquist | 210/169 |
| 5,487,830 A | * 1/1996 | Huppert | 210/169 |
| 5,849,184 A | * 12/1998 | Veillet | 210/242.1 |
| 5,930,848 A | * 8/1999 | Last | 4/502 |
| 5,951,858 A | * 9/1999 | Soto et al. | 210/238 |

* cited by examiner

Primary Examiner—Christopher Upton
(74) Attorney, Agent, or Firm—Goldstein Law Offices, P.C.

(57) ABSTRACT

A covering, cleaning and heating system, which includes a solar cover dimensioned for covering a swimming pool and effectively heating the water therein using solar energy. The solar cover has a free end securable to an elongated pole. The elongated pole has a rope loop which facilitates selective securement of the pool cover to the elongated pole without requiring permanent fastening thereof. The elongated pole has a offset handle disposed on a free end thereof which acts like a crank such that whereby rotation of the handle will cause the solar cover to wrap around the elongated pole. A bracket is fixed at or near the periphery of the pool. The elongated pole selectively extends into the bracket while the cover is being rolled up or unrolled. A cleaning portion is also selectively secured within the bracket at the periphery of the swimming pool. The cleaning portion has a horizontal pole which attaches within the bracket and extends outwardly therefrom over the swimming pool. The horizontal pole has a plurality of apertures therethrough which may be used for mating with the bracket. A skimmer extends downward from the horizontal pole for positioning within the swimming pool water to provide automatic skimming as the water currents bring debris to the skimmer.

4 Claims, 3 Drawing Sheets

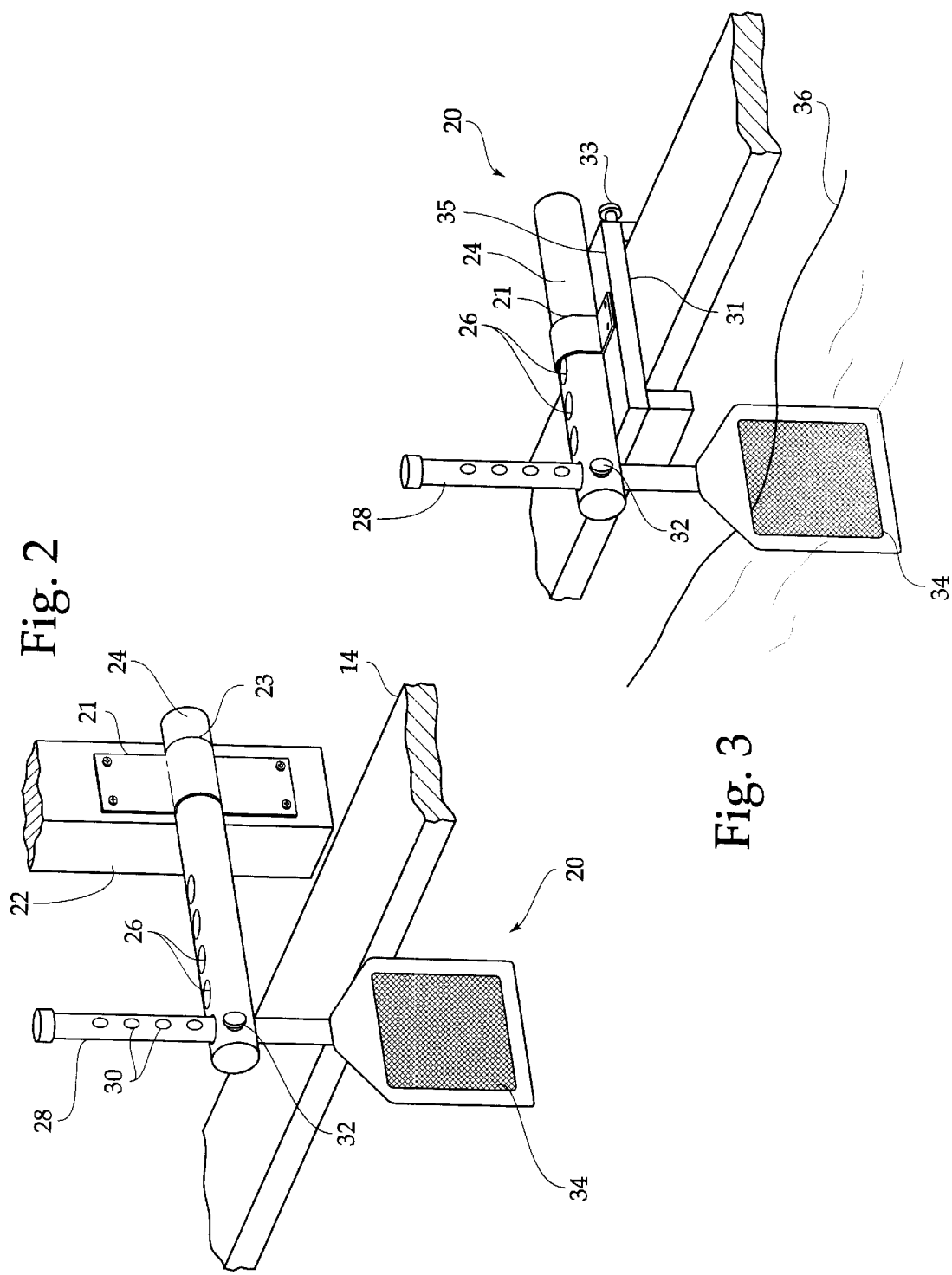

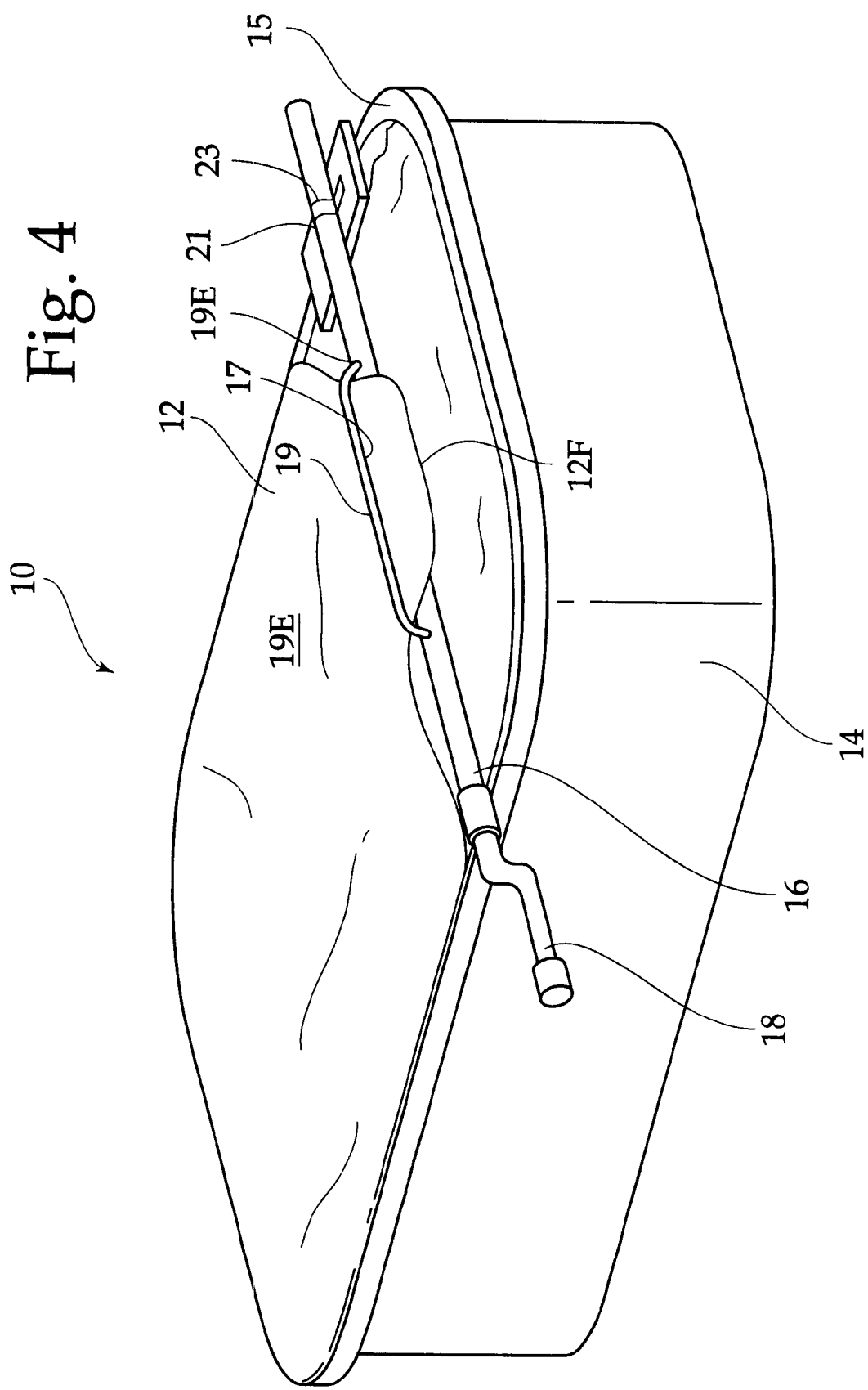

SWIMMING POOL COVERING, HEATING, AND CLEANING SYSTEM

CROSS REFERENCES AND RELATED SUBJECT MATTER

This application relates to subject matter contained in provisional patent application Ser. No. 60/165,022, filed in the United States Patent & Trademark Office on Nov. 12, 1999.

BACKGROUND OF THE INVENTION

The present invention relates to a swimming pool covering, heating, and cleaning system and more particularly pertains to allowing a swimming pool to be covered, heated, and cleaned with a single system.

The use of swimming pools covers and cleaners is known in the prior art. More specifically, swimming pools covers and cleaners heretofore devised and utilized for the purpose of covering and cleaning swimming pools are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,499,174 to Carey discloses a retractable swimming pool cover. U.S. Pat. No. 3,074,079 to Isaacson discloses a retractable cover for swimming pools. U.S. Pat. No. 5,759,388 to Cote discloses a pool skimmer with safety disconnect means. U.S. Pat. No. 4,411,031 to Stolar discloses a buoyant swimming pool cover. U.S. Pat. No. 3,927,427 to Aine discloses a swimming pool cover. U.S. Pat. No. 3,856,679 to Jackson discloses a pool skimmer net. U.S. Pat. No. 5,060,928 to Vits discloses an apparatus for the depositing of sheets at a stacking location. U.S. Pat. No. 5,137,623 to Wall et al. Discloses a multi-purpose pool skimmer and method of making same.

While these devices fulfill their respective, particular objective and requirements, the aforementioned patents do not describe a swimming pool covering, heating, and cleaning system for allowing a swimming pool to be covered, heated, and cleaned with a single system.

In this respect, the swimming pool covering, heating, and cleaning system according to the present invention substantially departs from the conventional concepts and designs of the prior art, and in doing so provides an apparatus primarily developed for the purpose of allowing a swimming pool to be covered, heated, and cleaned with a single system.

Therefore, it can be appreciated that there exists a continuing need for a new and improved swimming pool covering, heating, and cleaning system, which can be used for allowing a swimming pool to be covered, heated, and cleaned with a single system. In this regard, the present invention substantially fulfills this need.

SUMMARY OF THE INVENTION

In the view of the foregoing disadvantages inherent in the known types of swimming pools covers and cleaners now present in the prior art, the present invention provides an improved swimming pool covering, heating, and cleaning system. As such, the general purpose of the present invention, which will be described subsequently in greater detail, is to provide a new and improved swimming pool covering, heating, and cleaning system and method which has all the advantages of the prior art and none of the disadvantages.

To attain this, the present invention essentially comprises a solar cover dimensioned for covering a swimming pool and effectively heating the water therein using solar energy. The solar cover has a free end securable to an elongated pole. The elongated pole has a rope loop which facilitates selective securement of the pool cover to th elongated pole without requiring permanent fastening thereof. The elongated pole has a offset handle disposed on a free end thereof which acts like a crank whereby rotation of the handle will cause the solar cover to wrap around the elongated pole. A bracket is fixed at or near the periphery of the pool. The elongated pole selectively extends into the bracket while the cover is being rolled up or unrolled. A cleaning portion also selectively extends into the bracket at the periphery of the swimming pool. The cleaning portion has a horizontal pole which attaches within the bracket and extends outwardly therefrom over the swimming pool. The horizontal pole has a plurality of apertures therethrough which may be used for mating with the bracket. The cleaning portion includes a vertical pole extending downwardly through one of the plurality of apertures of the horizontal pole. The vertical pole has a plurality of apertures therethrough for receiving a bolting member for securing the vertical pole to the horizontal pole. A lower end of the vertical pole has a fine screen skimmer secured thereto for positioning within the swimming pool water to provide automatic skimming as the water currents bring debris through the skimmer screen.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved swimming pool covering, heating, and cleaning system, which has all the advantages of the prior art swimming pools covers and cleaners and none of the disadvantages.

It is another object of the present invention to provide a new and improved swimming pool covering, heating, and cleaning system, which may be easily and efficiently manufactured and marketed.

It is a further object of the present invention to provide a new and improved swimming pool covering, heating, and cleaning system, which is of durable and reliable construction. An even further object of the present invention is to provide a new and improved swimming pool covering, heating, and cleaning system which is susceptible of a low cost of manufacture with regard to both materials and labor, and which accordingly is then susceptible of low prices of sale to the consuming public, thereby making such swimming pool covering, heating, and cleaning system economically available to the buying public.

Even still another object of the present invention is to provide a new and improved swimming pool covering, heating, and cleaning system for allowing a swimming pool to be covered, heated, and cleaned with a single system.

Lastly, it is an object of the present invention to provide a new and improved covering, cleaning and heating system, which includes a solar cover dimensioned for covering a swimming pool and effectively heating the water therein using solar energy. The solar cover has a free end securable to an elongated pole. The elongated pole has a rope loop which facilitates selective securement of the pool cover to the elongated pole without requiring permanent fastening thereof. The elongated pole has a offset handle disposed on a free end thereof which acts like a crank such that whereby rotation of the handle will cause the solar cover to wrap around the elongated pole. A bracket is fixed at or near the periphery of the pool. The elongated pole selectively extends into the bracket while the cover is being rolled up or unrolled. A cleaning portion is also selectively secured within the bracket at the periphery of the swimming pool. The cleaning portion has a horizontal pole which attaches within the bracket and extends outwardly therefrom over the swimming pool. The horizontal pole has a plurality of apertures therethrough which may be used for mating with the bracket. The cleaning portion includes a vertical pole extending downwardly through one of the plurality of apertures of the horizontal pole. The vertical pole has a plurality of apertures therethrough for receiving a bolting member for securing the vertical pole to the horizontal pole. A lower end of the vertical pole has a fine screen skimmer secured thereto for positioning within the swimming pool water to provide automatic skimming as the water currents bring debris through the skimmer screen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the pool-cleaning portion of the present invention illustrated mounted within the bracket, wherein the bracket in the shown embodiment is mounted to a fixed structure adjacent to the pool.

FIG. 3 is a perspective view of the pool-cleaning portion of the present invention wherein the bracket is part of a removable rim clamp which selectively attachable onto the rim of the pool.

FIG. 4 is a diagrammatic perspective view showing the elongated pole extending into the bracket, and wherein the pool cover is being attached to the elongated pole by inserting an end of the cover between the pole and the rope loop attached to pole.

The same reference numerals refer to the same parts through the various figures.

DESCRIPTION OF THE PREFERRED EMBODIMENT

Figure 1:
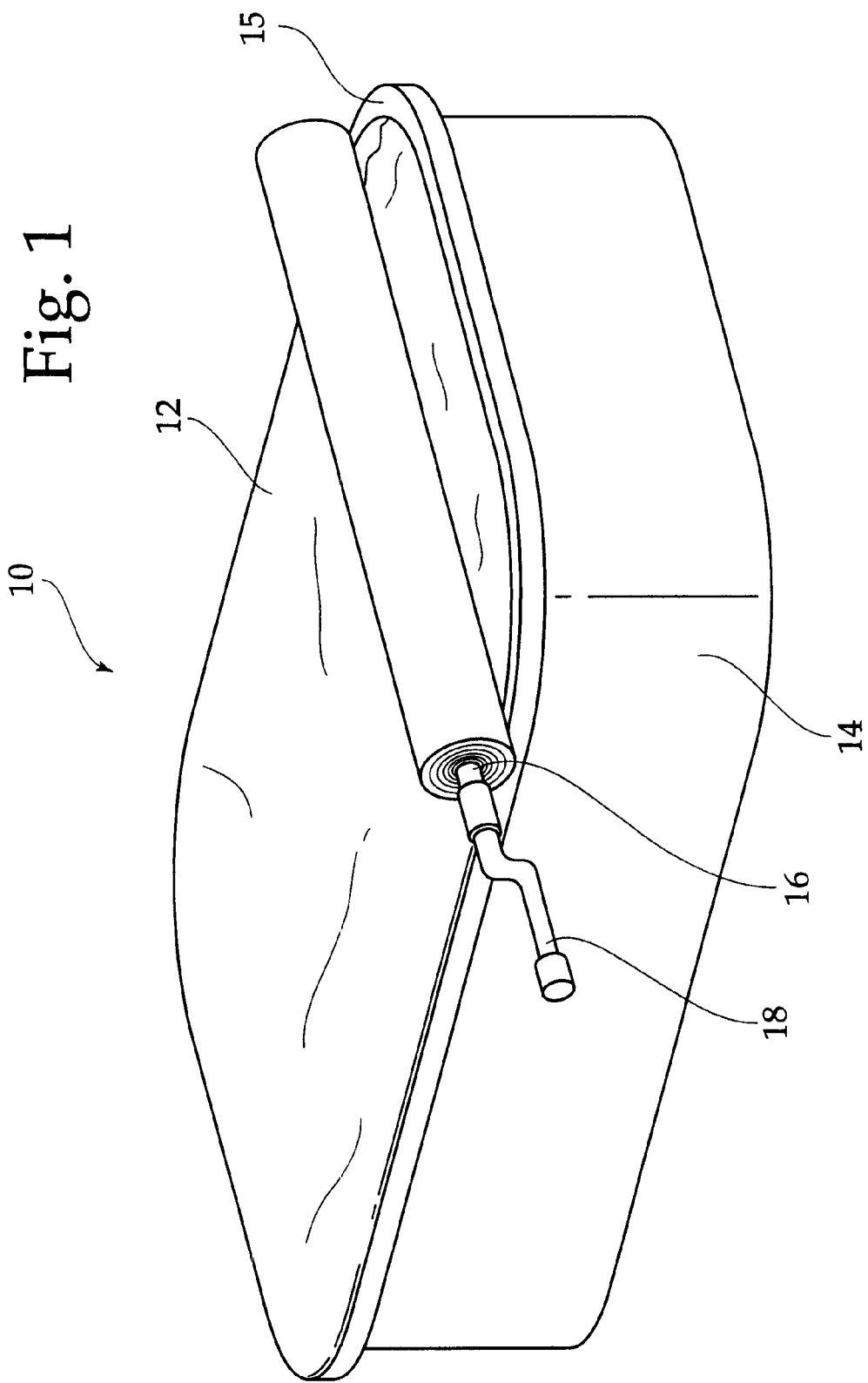
FIG. 1 is a perspective view of the preferred embodiment of the swimming pool covering, heating, and cleaning system constructed in accordance with the principles of the present invention, wherein the cover has been rolled up around the elongated pole of the present invention.

With reference now to the drawings, and in particular, to FIGS. 1 through 4 thereof, the preferred embodiment of the new and improved swimming pool covering, heating, and cleaning system embodying the principles and concepts of the present invention and generally designated by the reference number 10 will be described.

Specifically, it will be noted in the various Figures that the device relates to a swimming pool covering, heating, and cleaning system for allowing a swimming pool to be covered, heated, and cleaned with a single system. In its broadest context, the device consists of a solar cover and a cleaning portion. The solar cover serves the dual purposes of covering the pool and allowing solar heating of the pool to take place. The cleaning portion allows debris to be easily removed from the water. Such components are individually configured and correlated with respect to each other so as to attain the desired objective.

The solar cover 12 is dimensioned for covering a swimming pool 14, having a pool rim 15. Referring to FIG. 4, the solar cover 12 has a free end 12F which is initially secured to an elongated pole 16. To facilitate securement, the elongated pole 16 has a rope loop 17, created by a rope 19, having a pair of rope ends 19E which are secured along the elongated pole 16 such that the rope 19 extends substantially parallel to the elongated pole 16. The rope loop 17 allows the free end 12F to be inserted therein, such that when the pole is rotated and the cover 12 wraps around the free end 12F, the cover 12 will be maintained securely onto the elongated pole 16 so that the cover 12 may be rolled thereon by simply rotating the elongated pole. Accordingly, using the rope loop 17 of the present invention, there is no need to permanently attach the cover 12 to the pole 16, and there is no need to permanently alter or damage the cover 12 by placing attachment holes or grommets in the free end 12F.

The elongated pole 16 has a handle 18 at one end thereof whereby rotation of the handle 18 will cause the solar cover 12 to wrap around the elongated pole 16. Accordingly the handle 18 is an offset but parallel portion of the elongated pole 16, which creates a "crank-like" feel for the handle. When in use, the solar cover 12 will satisfy two functions. First, it will serve as a cover to prevent any debris from entering into the water. Second, it will transmit solar rays from the sun to the water thereby heating the water, while providing thermal insulation to help keep the heat from escaping therefrom. Note FIG. 1.

The cleaning portion 20 is selectively secured to a periphery of the swimming pool 14 using a bracket 21 which includes a sleeve 23. FIG. 2 illustrates the securement of the cleaning portion 20 to a structural member 22 immediately adjacent to the swimming pool 14, wherein the structural member 22 is a vertical post, and the bracket 21 is secured thereto to facilitate attachment of the cleaning portion 20. The cleaning portion includes a horizontal pole 24 which is mountable within the bracket 21, and then extends outwardly therefrom over the swimming pool 14. The horizontal pole 24 has a plurality of vertically extending apertures 26 therethrough. The cleaning portion 20 includes a vertical pole 28 extending downwardly through one of the plurality of apertures 26 of the horizontal pole 24, in order to adjust the horizontal position of the vertical pole 28. The vertical pole 28 has a plurality of apertures 30 therethrough for receiving a bolting member 32 for securing the vertical pole 28 to the horizontal pole 24 at various vertical positions. A lower end of the vertical pole 28 has a skimmer 34 secured thereto, having a fine mesh screen for positioning within water 36 that fills the swimming pool 14, and remove debris therefrom using existing water currents to eventually cause debris to travel to and get caught by the skimmer 34. The plurality of apertures 26, 30 allow for the skimmer 34 to be properly positioned so as to best accomplish its primary objective of gathering debris.

FIG. 3 shows another embodiment of the invention, wherein a rim clamp 31 is used to secure the bracket 21 to the pool rim 15. The rim clamp 31 extends over the rim 15, holds tight against the rim 15 from both the inside and outside thereof, and is tensioned thereagainst using a set screw 33. The rim clamp 31 has an upper surface 35. The bracket 21 is attached onto the upper surface 35, such that the sleeve 23 thereof is transverse to the rim 15 and is directed toward the pool.

Accordingly, referring to FIG. 4, when the pool cover 12 is either being deployed or being "rolled-up", the elongated pole 16 extends into the sleeve 23 of the bracket 21. At the opposite end of the elongated pole 16, a user turns the handle either clockwise or counter-clockwise as appropriate, whereby the pole 16 is supported by and is allowed to rotate within the bracket 21. In accordance with the previous discussion, at other times the cleaning portion 20 may be used in conjunction with the bracket 21, whereby the skimmer 34 is effectively supported thereby.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A swimming pool covering, heating, and cleaning system for allowing a swimming pool having a rim and pool water to be covered, heated, and cleaned with a single system comprising, in combination:

a bracket, the bracket having a sleeve, the bracket mounted near the pool rim such that the sleeve extends transverse to the pool rim;

an elongated pole having a handle end and a pole free end opposite therefrom, and a elongated pole length therebetween, the pole free end is mountable within the bracket to allow rotation of said elongated pole therein, the elongated pole having a rope having a pair of rope ends, the rope ends are attached at two points along the elongated pole length to form a rope loop;

a solar cover dimensioned for covering a swimming pool, the solar cover having a free end which is selectively inserted through the rope loop of the elongated pole to then secure said cover to the elongated pole, whereby rotation of the handle will cause the solar cover to wrap around the elongated pole; and a cleaning portion secured to a periphery of the swimming pool, the cleaning portion including a horizontal pole extending selectively mountable in the bracket when the elongated pole is not positioned therein, the horizontal pole extending outwardly therefrom over the swimming pool, a skimmer extends downward from the horizontal pole such that the skimmer is positioned in the pool water to catch debris therein.

2. The swimming pool covering, heating, and cleaning system as recited in claim 1, wherein the horizontal pole has a plurality of apertures therethrough, the cleaning portion further including a vertical pole extending downwardly through one of the plurality of apertures of the horizontal pole, the vertical pole having a plurality of apertures therethrough for receiving a bolting member for securing the vertical pole to the horizontal pole, a lower end of the vertical pole having the skimmer secured thereto for positioning within the swimming pool water.

3. The swimming pool covering, heating, and cleaning system as recited in claim 2, further comprising a rim clamp having an upper surface, the rim clamp mounts to the pool rim, the upper surface extending across the pool rim, the bracket is mounted to the upper surface.

4. A swimming pool covering, heating, and cleaning method, for use on a swimming pool having a rim and a bracket having a sleeve mounted near the rim, a solar cover dimensioned to cover the pool within the rim and having a free end, using an elongated pole having an elongated pole free end, a handle opposite from said elongated pole free end, and a rope loop attached thereto between said handle and said free end, also using a cleaning portion having a horizontal pole which is mountable within the sleeve and a skimmer extending downward from said horizontal pole, comprising the steps of:

extending the elongated pole across the pool;

inserting the elongated pole free end into the sleeve;

inserting the solar cover free end into the rope loop;

wrapping the solar cover around the elongated pole by rotating the elongated pole by turning the handle;

removing the elongated pole and solar cover wrapped therearound from the pool by removing the elongated pole from the sleeve;

inserting the horizontal pole into the sleeve; and extending the skimmer downward from the horizontal pole into the swimming pool water to clean debris therefrom.

\* \* \* \* \*